CYCLIC PROGRESSION GAME TABLE SET

Filed Nov. 22, 1948 2 SHEETS—SHEET 1

| | 1 | 2 |
|---|---|---|
| N | $N^1$ | $W^1$ |
| E | $E^2$ | $S^2$ |
| S | $N^2$ | $W^2$ |
| W | $E^1$ | $S^1$ |

| | 1 | 2 | 3 |
|---|---|---|---|
| N | $N^2$ | $W^2$ | $N^1$ |
| E | $S^2$ | $E^3$ | $S^1$ |
| S | $W^1$ | $N^3$ | $E^2$ |
| W | $E^1$ | $S^3$ | $W^3$ |

INVENTOR.
Frank S. Greene
BY
Albert M. Zalkind

| | 1 | 2 | 3 |
|---|---|---|---|
| N | $S^2$ | $S^1$ | $E^1$ |
| E | $N^1$ | $N^2$ | $W^3$ |
| S | $W^2$ | $W^1$ | $N^3$ |
| W | $E^3$ | $S^3$ | $E^2$ |

Fig. 4

| | 1 | 2 | 3 |
|---|---|---|---|
| N | $E^3$ | $N^1$ | $E^1$ |
| E | $S^2$ | $W^3$ | $E^2$ |
| S | $S^3$ | $W^2$ | $N^2$ |
| W | $S^1$ | $W^1$ | $N^3$ |

Fig. 5

| | 1 | 2 | 3 |
|---|---|---|---|
| N | $S^1$ | $N^1$ | $E^1$ |
| E | $S^3$ | $W^2$ | $E^2$ |
| S | $S^2$ | $W^3$ | $N^2$ |
| W | $E^3$ | $N^3$ | $W^1$ |

Fig. 6

| | 1 | 2 | 3 | 4 | 5 |
|---|---|---|---|---|---|
| N | $S^4$ | $S^2$ | $S^1$ | $E^5$ | $E^1$ |
| E | $N^1$ | $N^4$ | $W^5$ | $W^1$ | $N^2$ |
| S | $N^5$ | $N^3$ | $W^3$ | $W^2$ | $W^4$ |
| W | $E^3$ | $S^5$ | $E^2$ | $E^4$ | $S^3$ |

Fig. 7

| | 1 | 2 | 3 | 4 | 5 |
|---|---|---|---|---|---|
| N | $S^4$ | $S^5$ | $N^1$ | $W^1$ | $S^1$ |
| E | $E^5$ | $S^3$ | $W^2$ | $W^5$ | $N^3$ |
| S | $E^3$ | $N^4$ | $W^3$ | $E^4$ | $S^2$ |
| W | $E^1$ | $N^2$ | $N^5$ | $E^2$ | $W^4$ |

Fig. 8

| | 1 | 2 | 3 | 4 | 5 | 6 |
|---|---|---|---|---|---|---|
| N | $E^5$ | $S^1$ | $E^1$ | $S^3$ | $E^3$ | $S^5$ |
| E | $N^4$ | $W^2$ | $N^6$ | $W^4$ | $N^2$ | $W^6$ |
| S | $E^6$ | $S^6$ | $E^2$ | $S^2$ | $E^4$ | $S^4$ |
| W | $N^3$ | $W^5$ | $N^5$ | $W^1$ | $N^1$ | $W^3$ |

Fig. 9

INVENTOR.
Frank S. Greene
BY
Albert M. Zalkind

Patented Feb. 12, 1952

2,585,380

UNITED STATES PATENT OFFICE 2,585,380

CYCLIC PROGRESSION GAME TABLE SET

Frank S. Greene, Cleveland Heights, Ohio

Application November 22, 1948, Serial No. 61,390

5 Claims. (Cl. 273—148)

This invention relates to game table sets and has for its object to effect a cyclic progression of players through playing positions at the various tables of the set in such manner that a series of different combinations of players will be caused to appear cyclically at each table by means of simple move indicating indicia on the tables at the playing positions. The present application is a continuation in part of my copending application Serial No. 604,582, filed July 12, 1945, now abandoned.

A further object is to effect the cyclic progression by means of a redistribution of players that is effected by move directing indicia at the playing positions and that is repeated after each game, the players comprising a group and the player arrangements for successive games of a series being the result of the same substitution performed repeatedly upon the group.

In progressive card games it is desirable that each player of the group play at the same table with as many of the other players of the group as possible in a limited number of games and that each player have as many of the others as a partner as possible during the series. In party games in which the group is composed of men and women in equal numbers, it is desirable that a uniform distribution of men and women be maintained throughout the series.

Specific objects of this invention are to provide substitution patterns which will cause each player of the group to play with all or nearly all of the others in a limited number of games, which will cause each player to have a series of different partners and which will maintain a uniform distribution of men and women.

With the above and other objects in view the invention may be said to comprise the cyclic progression game table set as illustrated in the accompanying drawings and hereinafter described together with the variations and modifications thereof that will be apparent to those skilled in the art.

Reference should be had to the accompanying drawings forming a part of this specification in which:

Fig. 1 shows a four table set embodying the invention, the position and move indicia being shown applied to detachable card table covers.

Figs. 2 to 9 are diagrammatic views in which the vertical rows of move indicating indicia are numbered consecutively to indicate the tables and the horizontal rows are designated N, E, S, and W to indicate the four playing positions North, East, South, and West at each table. The arrangements of the move directing indicia with respect to the position indicia are referred to herein as substitution patterns.

Fig. 2 shows a substitution pattern for a two table set.

Figs. 3, 4, 5, and 6 show substitution patterns for three table sets.

Figs. 7 and 8 show substitution patterns for five table sets.

Fig. 9 shows a substitution pattern for a six table set.

Figures 1, 2, 3:
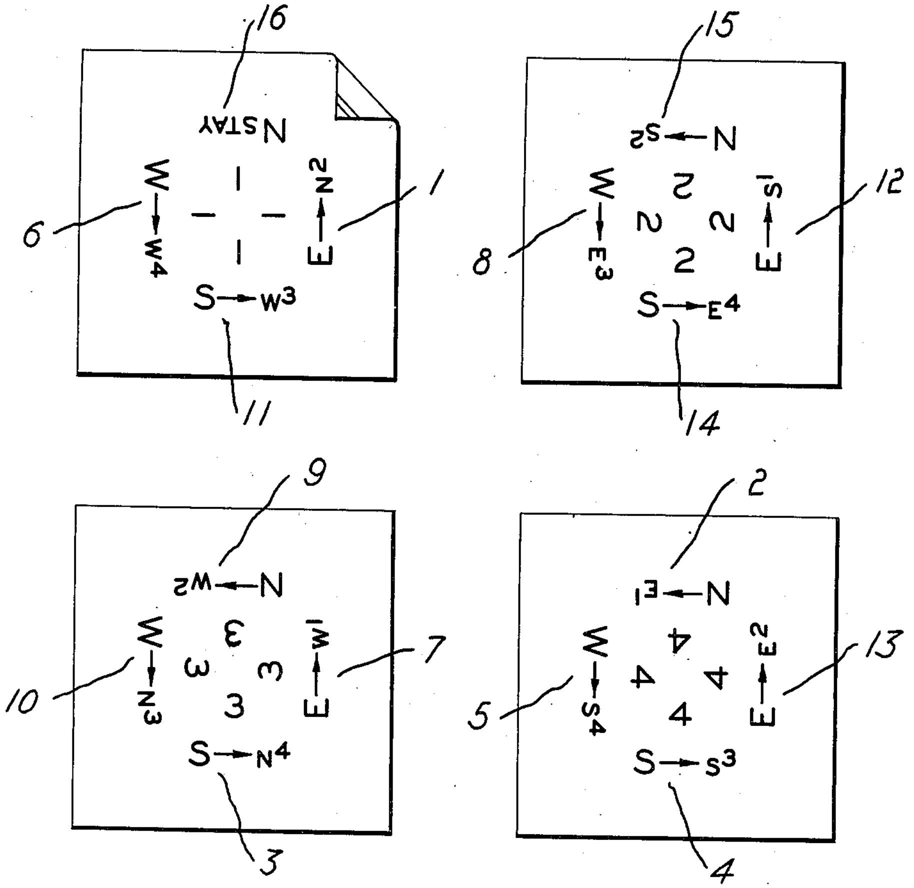

In Fig. 1 of the drawings the four tables are identified by the centrally placed numerals 1, 2, 3, and 4 and the playing positions North, East, South, and West are identified by the large letters N, E, S and W. The sixteen playing positions at the four tables are indicated by the letter, numeral combinations and at each playing position the playing position to which the player is to move for the next game is indicated.

For the purposes of the present invention the players are identified by the playing positions at which they start and the shifting of a player from one position to another is considered a substitution, the move directing indicia at the playing positions, effecting a rearrangement of players which is a substitution imposed upon the group. It will be noted that the player at each position other than North table 1 moves to a different position and that there is a substitution at each playing position other than North table 1. The entire group may however be considered to be a substitution group, the substitution at North table 1 being in mathematical terminology an identical substitution.

The arrangements of players for successive games is the result of the same substitution repeatedly imposed upon the group.

When the same substitution is repeatedly imposed upon the members of a group the members of the group that successively replace a given member form a cyclic series. All members of the group may be included in a single cyclic series or the group may comprise a plurality of sub-groups each composed of the members of a separate cyclic series.

Members of the same cyclic series appearing at selected starting positions are members of a cyclic series of combinations in which each combination in the series is composed of members having the same spacing in the cyclic series of individuals as the starting combination. To distinguish cycles composed of individuals from cycles of combinations, a cyclic series of individuals will be referred to as a "primary cycle" and a cyclic series of combinations as a "combination cycle." The pairs of players appearing successively in partnership relation at a given table and the combinations of four players appearing successively at a given table form "combination cycles."

If the order in which the members of a group appear in a single primary cycle or in a plurality of primary cycles be known, a substitution, which by repetition will produce the single primary cycle or the multiple primary cycles, can be readily determined.

In forming a substitution pattern for a set of game tables, each playing position is assigned a definite place in a single primary cycle or in one of a plurality of primary cycles, and the players successively appear at a given playing position in the order in which they are placed in the primary cycle or cycles. For example, if positions E1—W2—S3—E3—N2 form a primary cycle, the players who play successively at position E1 are the players who started at positions E1—W2—S3—E3—N2.

The character of the combination cycles which may be produced by repetition of a single substitution on a group of players is determined by the positions in the primary cycle or cycles occupied by the various playing positions, and, in order to provide advantageous cyclic player progressions, the relative positions of the players in the primary cycle or cycles may be determined in accordance with certain rules or theorems applicable to the problems presented in connection with various game table sets which may be stated as follows:

(1) In a group composed of the members of a primary cycle of $(2x+1)$ members, the combinations of two of such members may be separated into $x$ sub-groups each of which is composed of $(2x+1)$ pairs all having the same spacing in the primary cycle, each of the sub-groups forming a combination cycle.

(1a) If a primary cycle is composed of an even number of members such as $2x$, the combinations of two of such members may be separated into $(x-1)$ cyclic sub-groups, each composed of $2x$ pairs that have the same spacing in the primary cycle and an additional cyclic sub-group composed of $x$ pairs diametrically spaced in the primary cycle.

(2) If the players at a given table are members of the same primary cycle of $k$ members and the cyclic spacing of the one partner pair is different from the cyclic spacing of the other partner pair, no two players will be partners twice at that table during the cycle of $k$ games, except where $k$ is even and the spacing of one partner pair is $k/2$ in which case partner pairs will begin to appear for the second time after $k/2$ games.

(2a) If players starting at a plurality of tables are members of the same primary cycle of $k$ members and the cycle spacings of all cycle member partner pairs starting at the said tables are different no two of the cycle members will be partners twice at any of the tables during the cycle of $k$ games except when the spacing of one partner pair is $k/2$ in which case partner pairs having the $k/2$ spacing will begin to appear together for the second time after $k/2$ games.

(3) If the four players starting at a given table are members of the same primary cycle of $k$ members and the six combinations of two of the four players have six different cycle spacings, no two players will appear together twice at that table during the cycle of $k$ games except when $k$ is an even number and one of the pairs has a cycle spacing $k/2$, in which case the pairs with the spacings $k/2$ will begin to appear for the second time at the table after $k/2$ games.

(3a) If the primary cycle has $mx$ members, $x$ combinations of four of the cycle members that have the same primary cycle spacings and that are members of the same combination cycle and spaced apart $m$ places in the combination cycle may be assigned to $x$ tables provided that no one of the six primary cycle spacings in the combinations of four is equal to $m$, and, if the cycle spacings of the individual pairs in the cycle combination are all different, no two players will appear twice at any of the $x$ tables during the first $m$ games unless one of the primary cycle spacings is $mx/2$.

(4) If the players be assigned to positions in the primary cycle in such manner that every cycle spacing is included among the combinations of two starting at the various tables, each player included in the primary cycle will play with every other during a series of games corresponding in number to the number of members of the cycle.

(5) If all but one of the $4n$ players at $n$ tables are included in the primary cycle, there will be $(2n-1)$ cycle member partner pairs in the starting arrangement and $(6n-3)$ cycle member combinations of two that start at the same table.

(5a) If each of the $(2n-1)$ cycle member partner pairs in the starting arrangement of players has a different cycle spacing, no two players will be partners twice in a series of $(4n-1)$ games, and each player will have had each of the $(4n-2)$ other cycle members for a partner during the series.

(5b) If the starting arrangement of the $(4n-1)$ primary cycle member players be such that each of the $(2n-1)$ primary cycle spacings occurs 3 times in the cycle spacing of the $(6n-3)$ pairs of cycle member players that start at the same table, each of the said $(4n-1)$ players will play three times with each of the other $(4n-2)$ cycle member players during the series of $(4n-1)$ games.

(5c) If all but one of the $4n$ players at $n$ tables are included in the primary cycle, the player not included who stays at one position will have each of the $(4n-1)$ other players as a partner successively during the series of $(4n-1)$ games and will play with each of the other players three times during the series.

(6) If an equal number of men and women start at $n$ tables with men and women partners at each table and men and women at corresponding positions at all tables, the man woman partnership relation will persist throughout the series of games, if the men alternate with the women throughout a primary cycle of $4n$ members, or throughout each of a plurality of even numbered primary cycles making up the group of $4n$ players.

(7) If men be assigned to positions $(4x+1)$ and $(4x+2)$ and women to positions $(4x+3)$ and $(4x+4)$ in a primary cycle of $4n$ members and starting players at a given table are two men of the $(4x+1)$ positions in the cycle and two women of the $(4x+4)$ positions in the cycle, the players at that table for the second game and for every fourth game after the second game will be all men, the players at that table for the fourth game and for every second game after the fourth game will be all women and the players for all odd numbered games will be two men and two women.

In Fig. 1 of the drawings the reference numerals 1 to 15 inclusive are applied to the playing positions other than North table 1 in such manner as to indicate the positions in the primary cycle of the fifteen playing positions identifying the fifteen players who start at those positions, the numeral 16 being applied to the North position at table 1 where the identical substitution is indicated.

The positions North, East, South, and West at table 2 have the reference numerals 15, 12, 14, and 8 applied thereto, thereby indicating that the players starting at these positions occupy positions 15, 12, 14, and 8, respectively, in the primary cycle.

The six combinations of two players starting at table 2 designated by their cyclic positions are 15—12, 15—14, 15—8, 12—14, 12—8, and 14—8 and the cyclic spacing of the six combinations are 3, 1, 7, 2, 4, and 6.

In the cyclic series of fifteen members there are seven different spacings (theorem 1). Since no two pairs of players starting at table 2 have the same spacing in the primary cycle no two players will appear together twice at table 2 during the cycle of fifteen games (theorem 3).

The reference numerals applied to the positions N, E, S, and W at table 3 are 9, 7, 3, and 10 and the reference numerals applied to the positions N, E, S, and W at table 4 are 2, 13, 4, and 5. The combination of players starting at table 3 corresponds to the combination of players that will appear at table 2 for the eleventh game of the series and the combination of players starting at table 4 corresponds to the combination of players that will appear at table 2 for the sixth game.

Since no two players will appear together twice at table 2 during the series of fifteen games, it follows that no two players will appear together twice at tables 2, 3, and 4 during the first five games (theorem 3a).

The three positions E, S, and W at table 1 are designated 1, 11, and 6 and players starting at these positions occupy the 1st, 11th, and 6th positions in the primary cycle. The three combinations of two are 1—11, 1—6, and 11—6 and the spacing in each instance is 5, the cycle spacing being in each instance the shortest spacing between the members. Since all of the cycle spacings are included in the cycle combinations, each of the fifteen players included in the cycle will play with every other during the cycle (theorem 4).

ers are members of the primary cycle are 1—6 at table 1, 15—14 and 8—12 at table 2, 9—3 and 7—10 at table 3, and 2—4 and 13—5 at table 4. The cycle spacings of the seven partner pairs are 5, 1, 4, 6, 3, 2, and 7, and each of the players included in the primary cycle will have each of the other 14 players included in the cycle for a partner once (theorem 5a). The player who remains at North table 1 will have each of the 15 other players for a partner once and will play with each of the other players three times during the series of 15 games (theorem 5c).

Since the three cycle members starting at table 1 are spaced 5 places apart in the cycle, each of the fifteen cycle members will play at table 1 once during the first five games and each will play at table 1 three times during the fifteen game series. It follows, therefore, that each of the sixteen players will have played once with every one of the other fifteen in three games and that no two players will have appeared at the same table twice during the first five games. Also each of the sixteen players will have had each of the other fifteen players for a partner once and will have played with each of the other players three times during a series of fifteen games.

For party games where half the players are men and the other half women, it is desirable to provide a substitution pattern that will maintain a uniform distribution of men and women, avoiding combinations which include three men to one woman or vice versa.

This is accomplished in a four table set by providing an arrangement for one of the games in the series in which the players at two of the tables are all men and players at the other of the two tables are all women. Since no two players appear twice at the same table during a five game series, it follows that for any four of the five games the players at each table will play at four different tables during the fifth game, and, if during one game the men are at two of the tables and women are at the other two, there will be two men and two women at each table during the other four games.

The arrangement of the players for six successive games effected by the substitution pattern shown in Fig. 1 with the players indicated both by their starting positions and by their positions in the primary cycle is shown in the following chart:

| | Table 1 | | | | Table 2 | | | | Table 3 | | | | Table 4 | | | |
|---|---|---|---|---|---|---|---|---|---|---|---|---|---|---|---|---|
| 1 | 16 | 1 | 11 | 6 | 15 | 12 | 14 | 8 | 9 | 7 | 3 | 10 | 2 | 13 | 4 | 5 |
| | N1 | E1 | S1 | W1 | N2 | E2 | S2 | W2 | N3 | E3 | S3 | W3 | N4 | E4 | S4 | W4 |
| 2 | 16 | 2 | 12 | 7 | 1 | 13 | 15 | 9 | 10 | 8 | 4 | 11 | 3 | 14 | 5 | 6 |
| | N1 | N4 | E2 | E3 | E1 | E4 | N2 | N3 | W3 | W2 | S4 | S1 | S3 | S2 | W4 | W1 |
| 3 | 16 | 3 | 13 | 8 | 2 | 14 | 1 | 10 | 11 | 9 | 5 | 12 | 4 | 15 | 6 | 7 |
| | N1 | S3 | E4 | W2 | N4 | S2 | E1 | W3 | S1 | N3 | W4 | E2 | S4 | N2 | W1 | E3 |
| 4 | 16 | 4 | 14 | 9 | 3 | 15 | 2 | 11 | 12 | 10 | 6 | 13 | 5 | 1 | 7 | 8 |
| | N1 | S4 | S2 | N3 | S3 | N2 | N4 | S1 | E2 | W3 | W1 | E4 | W4 | E1 | E3 | W2 |
| 5 | 16 | 5 | 15 | 10 | 4 | 1 | 3 | 12 | 13 | 11 | 7 | 14 | 6 | 2 | 8 | 9 |
| | N1 | W4 | N2 | W3 | S4 | E1 | S3 | E2 | E4 | S1 | E3 | S2 | W1 | N4 | W2 | N3 |
| 6 | 16 | 6 | 1 | 11 | 5 | 2 | 4 | 13 | 14 | 12 | 8 | 15 | 7 | 3 | 9 | 10 |
| | N1 | W1 | E1 | S1 | W4 | N4 | S4 | E4 | S2 | E2 | W2 | N2 | E3 | S3 | N3 | W3 |

The spacings 1, 2, 3, 4, 6, and 7 each occur three times in the starting combinations at tables 2, 3, and 4, and the 5 spacing occurs three times at table 1. It follows therefore that each player included in the primary cycle will play with each of the others included in the cycle three times in fifteen games (theorem 5b).

The partner combinations in which both players are members of the primary cycle are 1—6 …

Assuming that men start at North and West at each table and women at East and South, it will be seen that men are partners with women in games 1, 2, 3, 4, and 6 and that in game 5 men are at tables 1 and 4 and women at tables 2 and 3. The player combinations for the sixth game are the same as for the first but the partner combinations are different.

When the players are all men or all women or when it is not desired to maintain uniform distribution of the men and women, each player may start at any position. However when it is desired to control the partnership relation it is necessary that men and women each be assigned to definite starting positions. For convenience it is assumed throughout this specification that men start at North and West and women at East and South. It will be apparent that the same result could be obtained with women starting at North and West and men at East and South. It is also apparent that equivalent dispersal patterns may be produced for starting arrangements in which men start at North and East and women at South and West.

It will be seen that the substitution indicia on tables 1 and 3 direct all players to positions initially occupied by men and that the substitution indicia on tables 2 and 4 direct all players to positions initially occupied by women. It follows, therefore, that men may start at tables 1 and 3 and women at tables 2 and 4 or vice versa, in which case the arrangement of players for the second game will be the conventional starting arrangement.

As shown in the chart each playing position follows the playing position designated by its associated substitution indicia in the primary cycle and the playing positions designated by the substitution indicia at each table and the playing positions at that table are successive combinations of a combination cycle. For example, the substitution indicia at table 1 are N1, N2, W3, and W4 which is the fifth combination at table 1 which is succeeded by the original combination for the sixth game. Also the substitution indicia at tables 2, 3, and 4 are the combinations appearing at tables 3, 4, and 2 for the fifth game.

As shown in the chart players successively occupying each position are numbered consecutively 1, 2, 3, etc. Other equivalent substitution patterns may be obtained by providing any spacing between successive members of the cycle that is not a divisor of 15. For example the cycle might be 1, 3, 5, etc., 1, 5, 9, etc., or 1, 8, 15, 7, etc. the only change in the result being the order in which the combinations appear. If a difference of three be employed the player arrangement appearing successively at each table will be the arrangements for every third game in the fifteen game series, providing a five game series in which no two players play at the same table twice and in which each of the players plays with every other.

It will be apparent that equivalent substitution patterns may be provided with the identical substitution or "stay" at any one of the sixteen playing positions, that the cycle positions of partner pairs at the various tables may be permuted and that the cycle positions of the combinations of four players at the various tables may be permuted. It is apparent therefore that many equivalent substitution patterns may be provided that will produce a cycle of combinations equivalent to that produced by the substitution pattern shown in Fig. 1.

Theorems 4, 5, 5*a*, 5*b*, and 5*c* may be applied to two table sets to provide a substitution pattern such as shown in Fig. 2 that will cause each of the eight players to play three times with each of the seven other players and be partners with each of the others once during a seven game series.

The player arrangements for the seven successive games of the series provided by the substitution pattern of Fig. 2 are as follows:

| | Table 1 | | | | Table 2 | | | |
|---|---|---|---|---|---|---|---|---|
| 1 | N1 | E1 | S1 | W1 | N2 | E2 | S2 | W2 |
| 2 | N1 | W1 | W2 | N2 | S1 | E1 | E2 | S2 |
| 3 | N1 | N2 | S2 | S1 | W2 | W1 | E1 | E2 |
| 4 | N1 | S1 | E2 | W2 | S2 | N2 | W1 | E1 |
| 5 | N1 | W2 | E1 | S2 | E2 | S1 | N2 | W1 |
| 6 | N1 | S2 | W1 | E2 | E1 | W2 | S1 | N2 |
| 7 | N1 | E2 | N2 | E1 | W1 | S2 | W2 | S1 |
| 8 | N1 | E1 | S1 | W1 | N2 | E2 | S2 | W2 |

As shown by the chart the order of the players in the primary cycle identified by their starting positions is E1, W1, N2, S1, W2, S2, E2, and E1. The positions of N2, E2, S2, and W2 in the cycle are 3, 7, 6, and 5 and the positions of E1, S1, and W1 in the cycle are 1, 4, and 2. The combinations of two players starting at table 2 are 3–7, 3–6, 3–5, 7–6, 7–5, 6–5 and the spacings are 3, 3, 2, 1, 2, 1. The combinations of two of the three players who are members of the cycle at table 1 are 1–4, 1–2, and 4–2 and the spacings are 3, 1, and 2.

Each of the three spacings of the cycle occurs three times; therefore each of the eight players will play with each of the seven others three times in the seven game cycle (theorems 5*b* and 5*c*). The partner combinations among the cycle members are 1–2, 3–6, 5–7 having spacings 1, 3, and 2 and each player will have each of the other seven players as a partner in the series of seven games (theorems 5*a* and 5*c*). By assigning the players to positions in the cycle such that two players shift from one table to the other after each game and the women are at one table and the men at the other during one game, uniform distribution of men and women is maintained. It will be observed from the chart that men and women are at separate tables during game 2, men and women are partners in games 1, 3, 4, and 5, and men play against women in games 6 and 7.

Fig. 3 shows a substitution pattern for a three table set satisfying the requirements of theorems 5, 5*a*, 5*b*, and 5*c*, providing a series of eleven games in which each of the twelve players plays with each of the eleven others three times and has each of the eleven others for a partner once.

The order in which the players are placed in the cycle produced by the substitution pattern of Fig. 3 is as follows: N1, N3, S2, E1, W1, S1, E3, E2, S3, W2, N2. The spacing of the partner pair (E1—W1) is 1 and (N1—S1) is 5. The spacing of the partner pair (N2—S2) is 3. The spacing of the partner pair (E2—W2) is 2. The spacing of the partner pair (N3—S3) is 4. The cycle, therefore, fulfils the requirements of theorems 5 and 5*a* and each of the twelve players will have each of the eleven others for a partner once during the series of 11 games.

The spacing in the cycle of the pairs (N1—E1), (N1—W1), (S1—W1), and (S1—E1) at table 1 are 3, 4, 1, 2. The spacing of corresponding pairs at tables 2 are 3, 1, 4, and 5. The spacings of pairs (N3—E3) and (E3—S3) at table 3 are 5 and 2. Three of each of the spacings 1, 2, 3, 4, and 5 occur in the fifteen pairs of cycle members starting at the three tables. The combination cycles therefore fulfil the requirements of theorem 5*b* and each of the twelve players will play with each of the other eleven three times in a series of eleven games. There are several possible arrangements of players in the eleven player cycle that meet the requirements of theorems 5*a*, 5*b*, and 5*c*, but there appear to be none that will maintain a uniform distribution of men and women throughout the series of eleven games. With the substitution pattern of Fig. 3, for example, there is an uneven distribution of men and women in games 5, 7, 8, and 10. If it is desired to maintain an equal distribution of men and women, substitution patterns based upon theorems 6 and 7, in which all playing positions are included in the primary cycle, may be provided as shown in Figs. 4 and 5.

The order of the players in the cycle produced by the substitution pattern of Fig. 4 is as follows: N1, E1, N3, S3, W2, S1, N2, E2, W3, E3, W1, S2. Women alternate with men throughout the cycle meeting the requirements of theorem 6. The players starting at table 2 are the same as the players that appear at table 1 for the seventh game. The cycle spacing of the partners (N1—S1) is 5, of (E1—W1) is 3, of (N2—S2) is 5, of (E2—W2) is 3, of (N3—S3) is 1, and of (E3—W3) is 1. The partner pairs (N1—S1) and (N2—S2) are spaced 6 places in the cycle. The same is true of (E1—W1) and (E2—W2) and (N3—S3) and (E3—W3). It follows that the players starting at table 1 are at table 2, the players starting at table 2 are at table 1, and the players starting at table 3 are at table 3 for the seventh game. Each player will have six different partners in a series of six games and since the men are always partners with women, each man will have had each of the women for a partner in the series of six games. A combination cycle including spacings 1, 2, 3, 4, and 5 is provided at tables 1 and 2 and the spacing 6 occurs at table 3, and, since the combinations at tables 1 and 2 are spaced apart 6 places in the combination cycle, each player will play with every other in a series of 6 games (theorems 3*a* and 4).

The order of the players in the cycle produced by the substitution pattern of Fig. 5 is as follows: N1, N2, S3, S1, W1, W2, S2, E1, N3, W3, E2, E3, N1. The men and women are disposed alternately in pairs as is required in theorem 7. The positions occupied by the players in the successive games is shown by the following chart:

| | Table 1 | | | | Table 2 | | | | Table 3 | | | |
|---|---|---|---|---|---|---|---|---|---|---|---|---|
| 1 | N1 | E1 | S1 | W1 | N2 | E2 | S2 | W2 | N3 | E3 | S3 | W3 |
| 2 | N2 | N3 | W1 | W2 | S3 | E3 | E1 | S2 | W3 | N1 | S1 | E2 |
| 3 | S3 | W3 | W2 | S2 | S1 | N1 | N3 | E1 | E2 | N2 | W1 | E3 |
| 4 | S1 | E2 | S2 | E1 | W1 | N2 | W3 | N3 | E3 | S3 | W2 | N1 |
| 5 | W1 | E3 | E1 | N3 | W2 | S3 | E2 | W3 | N1 | S1 | S2 | N2 |
| 6 | W2 | N1 | N3 | W3 | S2 | S1 | E3 | E2 | N2 | W1 | E1 | S3 |
| 7 | S2 | N2 | W3 | E2 | E1 | W1 | N1 | E3 | S3 | W2 | N3 | S1 |
| 8 | E1 | S3 | E2 | E3 | N3 | W2 | N2 | N1 | S1 | S2 | W3 | W1 |
| 9 | N3 | S1 | E3 | N1 | W3 | S2 | S3 | N2 | W1 | E1 | E2 | W2 |
| 10 | W3 | W1 | N1 | N2 | E2 | E1 | S1 | S3 | W2 | N3 | E3 | S2 |
| 11 | E2 | W2 | N2 | S3 | E3 | N3 | W1 | S1 | S2 | W3 | N1 | E1 |
| 12 | E3 | S2 | S3 | S1 | N1 | W3 | W2 | W1 | E1 | E2 | N2 | N3 |
| 13 | N1 | E1 | S1 | W1 | N2 | E2 | S2 | W2 | N3 | E3 | S3 | W3 |

It will be seen from this chart that the positions at table 1 are all occupied by men and the positions at table 2 are all occupied by women for games 2, 6, and 10, that women occupy all positions at table 1 and men all positions at table 2 for games 4, 8, and 12, and that men are partners with women at odd numbered games at tables 1 and 2 and in all games at table 3.

The cycle spacing of the pairs starting at table 1 are (N1—E1)—5, (N1—S1)—3, (N1—W1)—4, (E1—S1)—4, (E1—W1)—3, (S1—W1)—1. The corresponding cycle spacings of the pairs starting at table 2 are (3, 5, 4, 4, 5, 1) and at table 3 (3, 6, 1, 3, 2, 5). Since every possible spacing is included, the conditions of theorems 3*a* and 4 are satisfied and each player will play at the same table with every other during the cycle. The cycle spacing of the partner pairs are (N1—S1)—3, (E1—W1)—3, (N2—S2)—5, (E2—W2)—5, (N3—S3)—6, (E3—W3)—2. Although the partner pairs at tables 1 and 2 have the same cycle spacing, the pairs are so spaced in the cycle that there is no repeat in the partnership relation until the fifth game when W1 and E1 and W2 and E2 are partners for the second time. During the cycle each player has the seven others for partner.

The susbtitution pattern of Fig. 6 produces a cycle in which the order of the players is: N1, N2, S3, E1, N3, W2, E2, E3, W1, W3, S2, S1, N1. The order of the players in the cycle meets the requirements of theorem 7 as in Fig. 5. The player combinations are similar, but there is no repetition of partners until the sixth game. Each player has eight others for partner during the series, and there are, therefore, fewer partnership repetitions. However, no pair starting at any table are spaced apart 6 places in the cycle and each player will play with only ten of the others. N1 will not play with E2, E1 will not play with W3, etc. There is an advantage in having pairs who never play together. It sometimes happens that one couple is unable to get to a party on time. With a substitution pattern such as shown in Fig. 6, the players can start with positions N1 and E2, for example, vacant, and play three handed games at two of the tables until the delayed couple arrives. Also by designating the positions at which the players start, each man can play with everyone except his wife and vice versa.

Theorems 5, 5*a*, 5*b*, and 5*c* may be applied to table sets in which the number of tables is greater than 4, but since theorem 3*a* cannot be applied in cases where $4n-1$ is a prime number, more desirable combination cycles are obtainable in other ways.

Fig. 7 shows a substitution pattern for a five table set in which all 20 members are included in the primary cycle, in which each player has ten different partners in a series of ten games, in which the man woman partnership relation is maintained throughout the series, and in which each player plays with every other during the series.

The order in which the players appear in the series is N1, E1, N5, S1, N3, S2, N2, E5, N4, E2, W3, S3, W5, E3, W1, E4, W4, S5, W2, S4, N1. The men alternate with women throughout the cycle, meeting the requirements of theorem 6.

The cycle spacing of (N1—E1) is 1, (N1—S1) is 3, (N1—W1) is 6, (E1—S1) is 2, (E1—W1) is 7, and (S1—W1) is 9. The spacing of (N2—E2) is 3, of (N2—S2) is 1, of (N2—W2) is 8, of (E2—S2) is 4, of (E2—W2) is 9, and of (S2—W2) is 7. The players N1, E1, S1, and W1 are spaced 10 places in the cycle from players W3, S3, E3, and N3, and players N2, E2, S2, and W2 are spaced 10 places in the cycle from W4, S4, E4, and N4 so that a complete combination cycle is provided at tables 1 and 3 and tables 2 and 4 in ten games. The spacing of (N5—E5) is 5, of (N5—S5) is 5, of (N5—W5) is 10, of (E5—S5) is 10, of (E5—W5) is 5, and of S5—W5) is 5. For the sixth game at table 5 the arrangement is E5, W5, N5, S5, the original combination of four being at the table but the partnership relation changed. Each player will play twice at table 5 during a series of ten games.

The starting partner combinations at table 1 are (N1—S1), spacing 3 and (E1—W1), spacing 7; at table 2 (N2—S2), spacing 1 and (E2—W2), spacing 9; at table 3 (N3—S3), spacing 7 and (E3—W3), spacing 3; at table 4 (N4—S4), spacing 9 and (E4—W4), spacing 1. There is, therefore, no partnership repetition during the series of ten games (theorems 2 and 3a), and each man will have had each of the women as a partner during the series of ten games and vice versa. Since all cycle spacings are included and each combination cycle is completed in ten games, each player will have played with every other during a series of ten games (theorem 4).

A cycle of twenty members may be divided into five sub-cycles of four members each which have a spacing of 5 in the primary cycle, i. e., 1—6—11—16, 2—7—12—17, 3—8—13—18, 4—9—14—19, and 5—10—15—20. To obtain a substitution pattern such as shown in Fig. 7, the positions of players starting at table 1 are selected one from each of four of the five four-member cycles, in such manner that no two of the selected members have the same spacing and in such a manner that the men are represented by odd numbers and the women by even numbers. In the pattern shown in Fig. 7 the position of N1 in the cycle is 1, E1 is 2, S1 is 4 and W1 is 15. If the players at tables 2, 3, and 4 are the same as will appear at table 1 for the 6th, 11th, and 16th games, the sixteen players starting at tables 1, 2, 3, and 4 will include all of the players in four of the five sub-cycles, and the players of the remaining sub-cycle will start at the remaining table.

With a starting arrangement such as above described there will be no repetition of any combination during the first five games, during which each of the players will have played with fifteen of the others. With the positions of the players in the primary cycle assigned as above described, the combinations appearing at the tables for the sixth game would be the same as the starting combinations, and for each player there would be four others who would never play at the same table with him. The spacings of the players at table 1 in the primary cycle are 1, 3, 6, 2, 7, 9, and if the spacings at tables 2, 3, and 4 are the same, spacings 4 and 8 will not appear at any table.

The pattern shown in Fig. 7 is obtained by transposing the positions of two of the players at tables 2 and 4. With the players at four tables in the same combination cycle, the positions of the players at tables 2 and 4 would be 6, 7, 9, 20 and 16, 17, 19, 10. By transposing the positions 9, 20 and 19, 10 the positions of players at tables 2 and 4 are 6, 7, 19, 10 and 16, 17, 9, 20 and the spacings of players at tables 2 and 4 are 1, 7, 4, 8, 3, 9.

With the substitution pattern of Fig. 7 the first repetition of a combination of two occurs in the fifth game, no player plays at the same table with another twice during the first four games, and each player plays with every other player in a series of ten games.

In Fig. 8 of the drawings a five table substitution pattern is provided which is like Fig. 7 in that a ten game series is provided in which each player has ten others for a partner and plays with every other player during a ten game series. The pattern shown in Fig. 8, however, is based upon theorem 7 instead of theorem 6. The primary cycle produced by the substitution indicated in Fig. 8 is as follows: N1, N3, E5, E1, W1, N4, S2, S5, N2, W2, E3, S1, N5, W3, S3, E2, W4, W5, E4, S4, N1.

The positions of the players starting at N1, E1, S1, and W1 in the primary cycle are 1, 4, 12, 5 and the cycle spacings of these players are 3, 9, 4, 8, 1, 7. The cycle positions for the players starting at table 1 are obtained in a manner similar to that described in connection with Fig. 7. The four positions are selected by taking one from each of four of the five sub-cycles. The selection is made in such manner as to provide two $(4x+1)$ positions and two $(4x+4)$ positions in accordance with theorem 7. If cycle positions of the players starting at tables 2, 3, and 4 were the 6th, 11th, and 16th combinations in the combination cycle starting with 1, 4, 12, 5, i. e., 6, 9, 17, 10; 11, 14, 2, 15; 16, 19, 7, 20. The players starting at table 2 would be all men and the players starting at table 4 would be all women, which is undesirable since it would require an alteration of the rule that men start at positions N and W and women at positions E and S. Also, since the spacings 2 and 6 do not occur, there would be for each player four others with whom that player would never play.

The pattern shown in Fig. 8 is obtained by transposing positions 6, 17 and 16, 7 at tables 2 and 4 so that the cycle positions of the players starting at tables 2 and 4 are 9, 16, 7, 10 and 6, 19, 20, 17. This transposition provides two men and two women at table 2 and table 4 and provide cycle spacings 7, 2, 1, 9, 6, 3. As with the substitution pattern of Fig. 7, all of the cycle spacings are included in the starting combinations and each player will play with every other in a series of ten games and no combination of players are together twice during the first four games. At tables 2, 4, and 5 there are two men and two women for each game of the series. For games 2, 6, and 10 the players at table 1 will be all men and at table 3 all women, and for games 4 and 8 the players at table 1 will be all women and at table 3 all men.

In Fig. 9 there is shown a substitution pattern for a six table set which provides a cycle of seven games in which each of the twenty-four players plays with twenty-one of the others and no player plays with any other player twice. This result is obtained by providing two primary cycles, one of twenty-one members and the other of three members.

The positions of the players in the cycle of 21 members is as follows: N1, W5, W2, E2, S3, N4, E1, N3, W1, W4, E4, S5, N6, E3, N5, W3, W6, E6, S1, N2, E5, N1. The cycle positions of the players in the cycle of three members is S2, S4, S6, S2.

The cycle positions of players starting at table 1 are 1, 7, 19, 9 and their cycle spacings are 6, 3, 8, 9, 2, 10. The players starting at tables 3 and 5 are the 8th and 15th combinations of the combination cycle starting with the combination of players at table 1, i. e., 8, 14, 5, 16 and 15, 21, 12, 2.

The cycle positions of players who are members of the twenty-one member cycle at table 2 are 20, 4, 3 and the cycle spacings are 5, 4, and 1. The cycle positions of the twenty-one cycle members at tables 4 and 6 are 6, 11, 10 and 13, 18, 17 which are the 8th and 15th combinations of the combination cycle starting with 20, 4, 3. All of the cycle spacings of the twenty-one member cycle except 7 are included in the starting combinations. It follows, therefore, that each of the members of the twenty-one member cycle will play with all but two of the other members during the seven game cycle, and no two of the twenty-one players will appear together twice at the same table during the seven game cycle (theorems 1, 3, 3*a*, and 4). By providing the arrangement S2, S4, S6, S2 each of the three members of the three member cycle will play with all of the players of the twenty-one member cycle during the seven games.

A uniform distribution of men and women throughout the series is maintained by so assigning the cycle positions of the players that in one game of the series men and women will be separated. The substitution indicated in Fig. 9 causes the men to play at tables 1, 3, and 5 and women at tables 2, 4, and 6 for the second game of the series.

It will be apparent that in all cases the same combination cycles may be produced by several different substitution patterns. The combination cycles will not be affected by changing the position of any or all partner pairs or by any permutation of the combinations of four among the tables, and that each such change will produce a different substitution pattern is also apparent. Also the starting combination of any combination cycle may be any one of the combinations of the cycle.

There are also other equivalent combination cycles meeting the requirements of the applicable theorems from which substitution patterns may be produced.

Preferred embodiments of the invention are herein shown and described, but it is to be understood that numerous variations of the embodiments shown and described are included within the scope of this invention.

What I claim is:

1. A set of related card game table members, each of said members being provided with its own distinctive table identifying indicia thereon, each of said members being additionally provided with identical groups of indicia wherein each group identifies four card playing positions oriented to conform to corresponding positions on respective tables, each of said members also having at each playing position substitution indicia to direct the player at each of said playing positions to a playing position for each successive game.

2. A set of related card game table members as set forth in claim 1, wherein said members comprise sheets adapted to rest on respective tables.

3. A set of related card game table members as set forth in claim 1, wherein said members comprise cloths adapted to cover the tops of respective tables.

4. A set of related card game table members as set forth in claim 1, there being $n$ such members, wherein $(4n-1)$ of the substitution indicia are in sequential relation to $(4n-1)$ of the position identifying indicia in a single primary cycle, no two pairs of playing positions included in the said primary cycle and occupied by partners having the same cycle spacing.

5. A set of related card game table members as set forth in claim 1, there being $n$ such members, all playing position indicia being included in the substitution indicia and the position and substitution indicia being sequentially related to include all the positions in a single primary cycle, said playing positions signifying two groups of players, each group consisting of corresponding pairs of non-partner positions, one from each of the $n$ members, the players of one of said groups alternating with players of the other group throughout the cycle, all spacings of the primary cycle being included in the pairs of playing positions of the $n$ members.

FRANK S. GREENE.

REFERENCES CITED

The following references are of record in the file of this patent:

UNITED STATES PATENTS

| Number | Name | Date |
|---|---|---|
| 1,354,151 | White | Sept. 28, 1920 |
| 2,016,767 | Bower | Oct. 8, 1935 |
| 2,025,966 | Williams | Dec. 31, 1935 |